US006889817B2

(12) United States Patent
Leisner

(10) Patent No.: US 6,889,817 B2
(45) Date of Patent: May 10, 2005

(54) ACCUMULATION-CAPABLE CURVED ELEMENT FOR A TRANSFER SYSTEM

(75) Inventor: Ernst Leisner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/484,351

(22) PCT Filed: Jul. 16, 2002

(86) PCT No.: PCT/EP02/07870

§ 371 (c)(1),
(2), (4) Date: Jan. 20, 2004

(87) PCT Pub. No.: WO03/020617

PCT Pub. Date: Mar. 13, 2003

(65) Prior Publication Data

US 2004/0178047 A1 Sep. 16, 2004

(30) Foreign Application Priority Data

Jul. 20, 2001 (DE) .......................... 101 35 591

(51) Int. Cl.⁷ ............................................. B65G 47/52
(52) U.S. Cl. ................................... 198/465.2; 198/817
(58) Field of Search .............................. 198/465.2, 817

(56) References Cited

U.S. PATENT DOCUMENTS

| 2,789,683 | A | * | 4/1957 | Stahl | 198/345.3 |
| 3,934,700 | A | * | 1/1976 | Schubert et al. | 198/345.3 |
| 4,094,104 | A | * | 6/1978 | Zerfahs et al. | 451/184 |
| 4,359,000 | A | * | 11/1982 | Tokunaga | 104/166 |
| 4,619,205 | A | * | 10/1986 | Sticht | 104/168 |
| 4,801,003 | A | * | 1/1989 | Costa | 198/802 |
| 5,176,245 | A | * | 1/1993 | Sekitani | 198/465.2 |
| 5,195,437 | A | * | 3/1993 | Wallace et al. | 104/172.3 |
| 5,884,753 | A | * | 3/1999 | Robertson et al. | 198/803.2 |
| 5,947,259 | A | * | 9/1999 | Leisner et al. | 198/465.3 |
| 6,308,818 | B1 | * | 10/2001 | Bonora et al. | 198/465.1 |

FOREIGN PATENT DOCUMENTS

| DE | 44 39 107 A | 5/1996 |
| DE | 195 22 546 A | 7/1996 |
| DE | 94 22 363 U | 10/2000 |
| DE | 199 34 361 A | 1/2001 |

* cited by examiner

Primary Examiner—Douglas Hess
(74) Attorney, Agent, or Firm—Michael J. Striker

(57) ABSTRACT

The present invention relates to a curve element (1) for a transfer system for transporting products, having a curve-going outer track (2) and an inner track. An outer guide (5) is disposed on the outside of the outer track (2). The outer track (2) is embodied in continuous form in the curved region, and the inner track is formed in two parts of a first inner track (3) and a second inner track (4). At least one of the first or second inner tracks (3, 4) protrudes rectilinearly into the curved region of the curve element (1).

10 Claims, 2 Drawing Sheets

ACCUMULATION-CAPABLE CURVED ELEMENT FOR A TRANSFER SYSTEM

BACKGROUND OF THE INVENTION

The present invention relates to a variable-flow curve element for a transfer system for transporting products, in particular for transporting workpiece holders on which the products are disposed.

In assembly, for instance, workpieces are conveyed from work station to work station by means of a transfer system. As the conveying means, often two constantly revolving parallel tracks are used, on which workpiece holders that hold workpieces are transported. Depending on the layout of the transfer system, curves or 180° deflections must also be provided. As curve elements for such transfer systems, so-called roller curves are for instance known, in which there are many rollers disposed side by side, the rollers extending over the full width of the track. The two tracks end upstream of the curve element and are deflected upstream of the curve element.

Another way of attaining a known curve element is to provide a round belt as the conveying means on the inside of the curve. On the outside of the curve, only a guide is provided. As a result, the workpiece holders are moved around the curve only by means of the driven round belt.

The two known curve elements described above have the disadvantage, however, that congestion cannot be allowed on the curve, because the workpiece holders can easily become jammed there, which thus interrupts transport onward. Moreover, especially with the round belt, if the workpiece holders become congested, excessively high wear would occur, which would significantly shorten its service life. In these known curve elements, it must therefore be assured that the workpiece holders pass through individually. This requires major effort and expense for control technology and moreover has an adverse effect on the shortest possible cycle time.

It is also known for the two tracks to be guided continuously through the curve by means of a curve-going roller chain. However, since the radius of the curve-going tracks is very limited, with such an embodiment only a long curve radius can be achieved, which adversely affects the space requirement and hence possible system layouts. Hence the use of this so-called double-track curve element is quite limited.

SUMMARY OF THE INVENTION

The curve element of the present invention for a transfer system has the advantage over the prior art that it is possible for the products or workpiece holders to be held temporarily in the curve element. Extraordinarily high wear at the tracks of the curve element does not occur. Moreover, with the curve element of the invention, a curve can be embodied with a very short radius, so that there are no restrictions in terms of the layout for the transfer system. The curve element of the invention can form curved regions that require only very little space, even in the case of a 180 ° curve. This is possible since according to the invention, only a curve-going outer track is embodied in continuous form in the curved region, while the inner track is not continuous, but instead is in two parts. The inner track comprises a first inner track and a second inner track, and at least one of the first or second inner tracks protrudes rectilinearly into the curved region. In other words, at least one of the inner tracks is embodied such that it no longer extends parallel to the outer track but instead is lengthened in a straight line into the curved region, so that it meets the outer track. To prevent the products or workpiece holders from dropping off the curve element, an outer guide, which also takes on the function of guiding the product or workpiece holder in the curved region, is disposed on the outside of the outer track.

Preferably, the inner track protruding into the curved region has a length such that it protrudes past an imaginary center line, which is located between the inner tracks and outer tracks that are parallel to one another. This makes it possible for the protruding inner track to reinforce the rotation of the product or workpiece holder in the curved region especially advantageously, since a constant relative motion exists between the workpiece holder and the inner track.

As a result, friction is reduced, and the curve can be traversed without problems. Moreover, the workpiece holder can thus be prevented from becoming caught, and so high operating reliability of the transfer system in the curve element can be assured.

To enable assuring especially good guidance of the product or workpiece holder in the curve element, an inner guide is preferably provided. This makes especially secure traversal of the curve element possible.

To assure a good transmission of force to the inner tracks of the curve element, one or both inner tracks preferably have chain tensioners.

In a curve element embodied as a 90° curve, preferably only one of the two inner tracks protrudes into the curved region.

In a curve element embodied as a 180° curve, preferably both the first and the second inner track of the split inner track protrude into the curved region. Especially preferably, the first and second inner tracks have the same length of protrusion into the curved region.

Preferably in a curve element for a 180° curve, only one drive mechanism is provided, which drives the outer track as well as both inner tracks. The two inner tracks are each driven via respective drive shafts.

In another preferred embodiment of the present invention, the curve element has two separate drive mechanisms, each of which drives one drive shaft.

In a further, different preferred embodiment of the present invention, the curve element has one drive mechanism and one reversing gear, which is disposed between the first and second inner tracks, for driving the second inner track.

Preferably, the outer track is embodied as a flat-plate chain, which comprises a curve-going roller chain with support plates secured to it. The inner track need not necessarily comprise a curve-going flat-plate chain; depending on the layout, however, it may be useful to embody the inner chain as a curve-going flat-plate chain as well, for instance if the inner chain in the next curved segment changes into an outer chain in the curved region.

Thus according to the invention, a variable-flow curve element is furnished that has low wear. Because of the split inner track, which in the curved region is no longer guided parallel to the outer track, a reinforcement of the cornering motion of the product or workpiece holder is also furnished. The curve element of the invention is simple in construction and can be operated reliably in the conveyor system. According to the invention, even the shortest radii can also be embodied, so that there are no restrictions in terms of the layout of the transfer system.

BRIEF DESCRIPTION OF THE DRAWING

Multiple exemplary embodiments of the invention are shown in the drawing and will be explained in further detail in the ensuing description.

DETAILED DESCRIPTION OF THE PREFERRED EMBODIMENTS

A curve element 1 in a first exemplary embodiment of the present invention will now be described, with reference to FIGS. 1 and 2.

Figure 1:
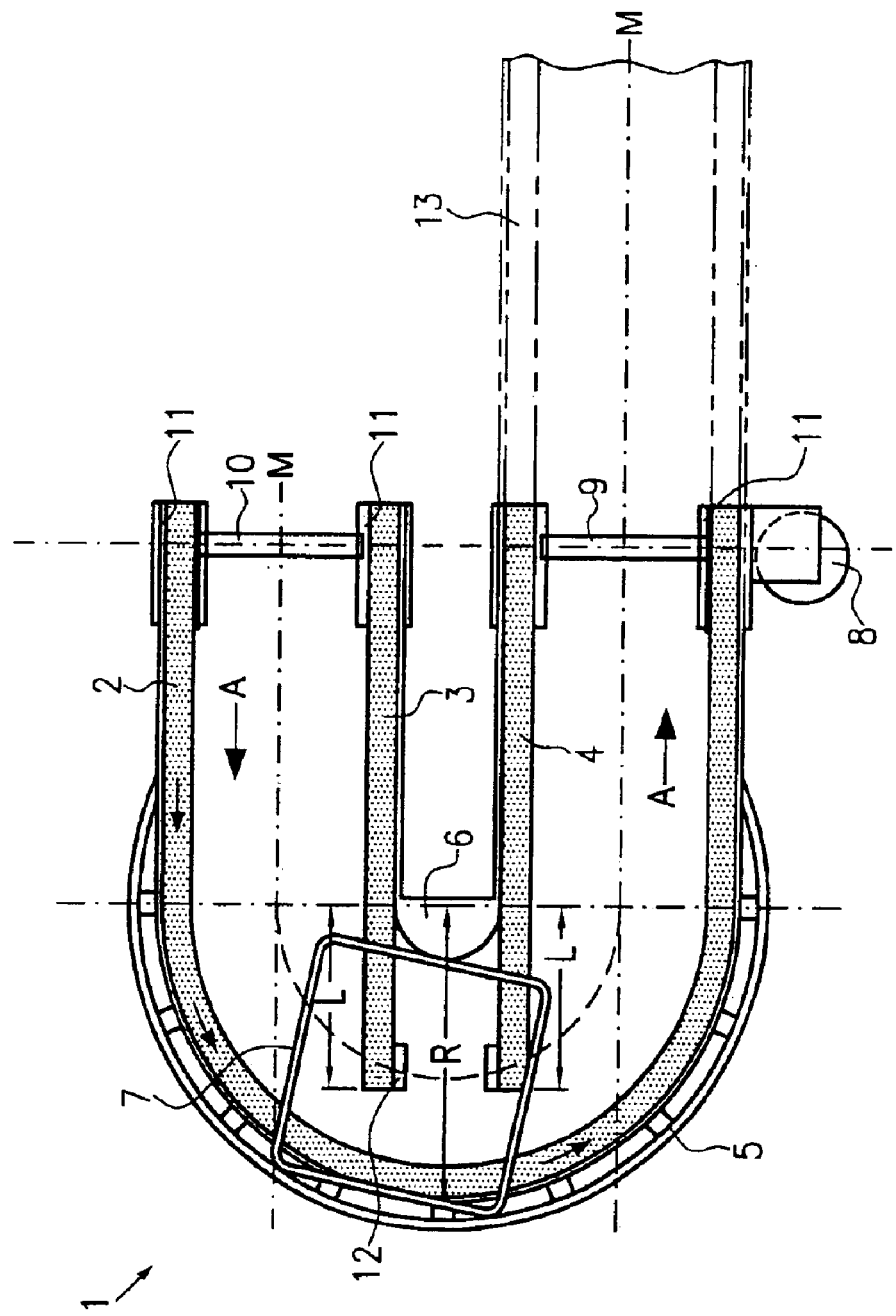
FIG. 1 shows a plan view of a curve element of the invention in a first exemplary embodiment of the present invention.
Figure 2:
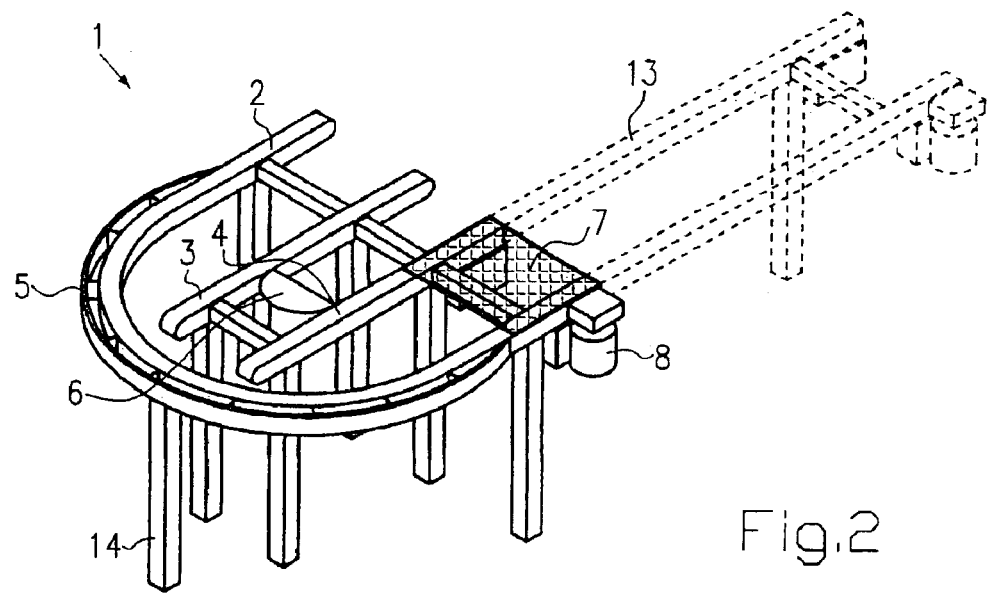
FIG. 2 shows a perspective view of the curve element shown in FIG. 1.

As shown in FIGS. 1 and 2, the curve element 1 includes an outer track 2, a first inner track 3, and a second inner track 4. The curve element 1 of the first exemplary embodiment forms a 180° curve. On the outside of the outer track 2, an outer guide 5 is provided, for guiding a workpiece holder 7, which rests on the outer track and the inner tracks, in the curved region. An inner guide 6 is also provided, which guides the workpiece holder 7 on the inner portion of the curved region.

The curve element 1 is modular in design, so that it can be used in the most various conveyor systems, and it is simple to change the layout using the curve element module.

Both the outer track 2 and the first and second inner tracks 3 and 4 are embodied as curve-going flat-plate chains, which includes a curve-going roller chain with plastic support plates clipped onto it. The chain is guided in an extruded aluminum profile section.

The radius R of the outer track 2 corresponds to a radius adapted to the size of the workpiece holder 7. Depending on the size of the workpiece holders 7, a 180° curve of minimal dimensions can thus be furnished.

Both the outer track and the first and second inner tracks each comprise an upper run and a lower run, and each have deflection stations 11 on their end portions (see FIG. 1). The curve element 1 is driven by a common drive mechanism 8, which directly drives the outer track 2 and also drives the second inner track 4 via a first drive shaft 9. The first inner track 3 is driven via a second drive shaft 10, which communicates with the end of the outer track 2 opposite the drive side and thus drives the first inner track 3 indirectly. To prevent the workpiece holder from catching on the pushing first inner track 3, a chain tensioner 12 is provided.

In FIGS. 1 and 2, a continuation of the conveyor system is also indicated by dashed lines. It should be noted that on its discharge side, where the drive mechanism 8 is disposed, the curve element may also have a greater length than that shown.

As can be seen particularly from FIG. 1, both the first inner track 3 and the second inner track 4 have a respective portion protruding rectilinearly into the curved region. Each protruding portion has a length L. The length L is markedly greater than half the radius R of the outer track 2. As a result, the two lengthened portions of the first and second inner tracks 3 and 4 protrude past a center line M—M, which defines the center between the otherwise parallel-extending outer track and inner tracks (see FIG. 1).

The function of the curve element 1 of the invention is as follows. The workpiece holder 7 runs rectilinearly into the curve and is guided into the curve by the continuous outer track 2 and the outer guide 5. The region of the first inner track 3 that protrudes into the curve forms a pushing unit, which reinforces the traversal of the curve, since between the workpiece holder 7 and the protruding region of the first inner track 3, a relative motion always prevails, so that the friction between these parts is reduced. As soon as the workpiece holder 7 has traversed the curve element past the middle of the 180° curve, it comes into contact with the second inner track 4, which pulls the workpiece holder 7 in the region of the discharge side, so that from this time on, the second inner track 4 reinforces the traversal of the curve by the workpiece holder 7. This situation is shown in FIG. 1.

During the entire traversal of the curve, the workpiece holder 7 is guided both on the outer guide 5 and on the inner guide 6, as a result of which in particular catching of the workpiece holder is prevented, so that high operating reliability can be assured.

Since a relative motion likewise constantly prevails between the second inner track 4 and the workpiece holder 7, the friction between these two elements is likewise reduced.

To achieve the greatest possible reinforcement of the process of rotation of both the first inner track 3 and the second inner track 4 during the traversal of the curve, the two protruding regions of the inner tracks 3 and 4 each have a length L which is greater than the length of half the radius R of the outer track. However, it is also possible for the protruding regions of the inner tracks 3 and 4 to have merely a lesser length than that. In that case, however, the reinforcement of the rotary motion during the traversal through the curve is reduced somewhat. The length of the two protruding regions of the first and second inner tracks should therefore be at least half the length of the radius R.

As shown in FIG. 2, the curve element is braced in a known fashion on many support feet 14.

Figure 3:
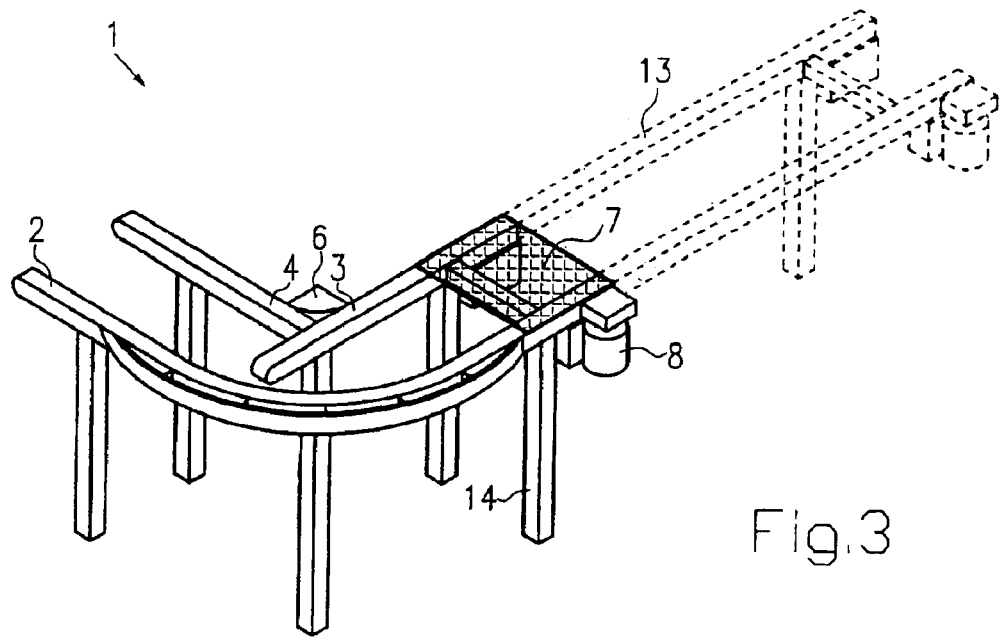
FIG. 3 shows a perspective view of a curve element of a second exemplary embodiment of the present invention.

In FIG. 3, the curve element 1 is shown in a second exemplary embodiment of the present invention. Identical or functionally identical parts are identified by the same reference numerals as in the first exemplary embodiment.

As shown in FIG. 3, the curve element 1 in the second exemplary embodiment is embodied as a 90° curve. Once again, the outer track 2 is embodied in continuous form, and the inner track is split into a first inner track 3 and second inner track 4. The two first and second inner tracks 3 and 4 each again have a protruding region, which protrudes rectilinearly into the curved region.

As FIG. 3 shows, the protruding region of the first inner track 3 is markedly longer and protrudes farther into the curved region than the protruding region of the second inner track 4. Thus the protruding region of the first inner track 3 protrudes markedly beyond an imaginary center line between the otherwise parallel-extending inner tracks and outer track. The second inner track 4 protrudes into the curved region in such a way that it is immediately adjacent the side of the first inner track 3.

As in the first exemplary embodiment, the protruding regions of the first and second inner tracks 3 and 4 each reinforce the rotary motion of a workpiece holder 7 being conveyed on the outer track and inner tracks.

Otherwise, the second exemplary embodiment corresponds substantially to the first exemplary embodiment, so that the above description of the first exemplary embodiment may be referred to.

Thus, the present invention relates to a curve element 1 for a transfer system for transporting products, having a curve-going outer track 2 and an inner track. An outer guide 5 is disposed on the outside of the outer track 2. The outer track 2 is embodied in continuous form in the curved region, and the inner track is formed in two parts of a first inner track 3 and a second inner track 4. At least one of the first or second inner tracks 3, 4 protrudes rectilinearly into the curved region of the curve element 1.

The above description of the exemplary embodiments in the present invention is intended solely for purposes of illustration and is not intended to limit the invention. Within the context of the invention, various changes and modifications may be made without departing from the scope of the invention or its equivalent.

What is claimed is:

1. A curve element for a transfer system for transporting products, including a curve-going outer track (2) and an inner track, on which tracks the products are transported directly or by means of workpiece holders (7), wherein an outer guide (5) is disposed on the outside of the outer track (2) and the outer track (2) is embodied in continuous form in the curved region; and wherein the inner track is formed in two parts from a first inner track (3) and a second inner track (4), and at least one of the first or second inner tracks (3, 4) protrudes rectilinearly into the curved region, and wherein at least the outer track (2) is embodied as a curve-going flat-plate chain.

2. The curve element of claim 1, wherein the first inner track (3) and/or the second inner track (4) protrudes into the curved region via an imaginary center line (M—M).

3. The curve element of claim 1, wherein that furthermore an inner guide (6) is provided, which guides the products or workpiece holders (7) on the inside of the curved region.

4. The curve element of of claim 1, wherein at least one of the first or second inner tracks (3, 4) is embodied with a chain tensioner (12).

5. The curve element of claim 1, wherein the curve element is embodied as a 90° curve, and only one of the first or second inner tracks (3, 4) protrudes into the curved region.

6. The curve element of claim 1, wherein the curve element is embodied as a 180° curve, and both the first inner track (3) and the second inner track (4) protrude into the curved region.

7. The curve element of claim 1, wherein the curve element includes two drive mechanism, each of which drives one drive shaft (9, 10).

8. A curve element for a transfer system for transporting products, including a curve-going outer track (2) and an inner track, on which tracks the products are transported directly or by means of workpiece holders (7), wherein an outer guide (5) is disposed on the outside of the outer track (2) and the outer track (2) is embodied in continuous form in the curved region; and wherein the inner track is formed in two parts from a first inner track (3) and a second inner track (4) and at least one of the first or second inner tracks (3, 4) protrudes rectilinearly into the curved region, and wherein the curve element includes one drive mechanism (8) and two drive shafts (9, 10) for driving the outer track (2) and the two inner tracks (3, 4).

9. A curve element for a transfer system for transporting products, including a curve-going outer track (2) and an inner track, on which tracks the products are transported directly or by means of workpiece holders (7), wherein an outer guide (5) disposed on the outside of the outer track (2) and the outer track (2) is embodied in continuous form in the curved region; and wherein the inner track is formed in two parts from a first inner track (3) and a second inner track (4), and at least one of the first or second inner tracks (3, 4) protrudes rectilinearly into the curved region, wherein the curve element includes a reversing gear, which is disposed between the first inner track (3) and the second inner track (4), for transmitting the driving force from one inner track to the other inner track.

10. A curve element for a transfer system for transporting products, including a curve-going outer track (2) and an inner track, on which tracks the products are transported directly or by means of workpiece holders (7), wherein an outer guide (5) is disposed on the outside of the outer track (2) and the outer track (2) is embodied in continuous form in the curved region; and wherein the inner track is formed in two parts from a first inner track (3) and a second inner track (4), and at least one of the first or second inner tracks (3, 4) protrudes rectilinearly into the curved region, wherein at least the outer track (2) is embodied as a curve-going flat-plate chain including a curve-going roller chain and having plastic support plates.

* * * * *